(12) United States Patent
Zhou

(10) Patent No.: US 11,784,368 B2
(45) Date of Patent: Oct. 10, 2023

(54) ENERGY STORAGE SYSTEM AND THERMAL MANAGEMENT METHOD FOR THE SAME

(71) Applicant: Sungrow Power Supply Co., Ltd., Hefei (CN)

(72) Inventor: Jianjie Zhou, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 190 days.

(21) Appl. No.: 17/381,477

(22) Filed: Jul. 21, 2021

(65) Prior Publication Data

US 2022/0173451 A1    Jun. 2, 2022

(30) Foreign Application Priority Data

Dec. 1, 2020 (CN) .......................... 202011385234.4

(51) Int. Cl.
*H01M 10/613* (2014.01)
*H01M 10/635* (2014.01)
(Continued)

(52) U.S. Cl.
CPC ..... *H01M 10/6561* (2015.04); *H01M 10/613* (2015.04); *H01M 10/615* (2015.04);
(Continued)

(58) Field of Classification Search
None
See application file for complete search history.

(56) References Cited

U.S. PATENT DOCUMENTS

| 2017/0077467 A1 | 3/2017 | Kronke et al. |
| 2020/0313257 A1 | 10/2020 | Naruke et al. |

(Continued)

FOREIGN PATENT DOCUMENTS

| CN | 106021810 A | 10/2016 |
| CN | 106972220 A | 7/2017 |

(Continued)

OTHER PUBLICATIONS

Machine translation of CN 107134604, Sep. 2017.*
(Continued)

*Primary Examiner* — Jonathan Crepeau
(74) *Attorney, Agent, or Firm* — Wolf, Greenfield & Sacks, P.C.

(57) ABSTRACT

An energy storage system and a thermal management method therefor are provided. The method is performed by a smart battery thermal management unit in the energy storage system. In the method, a charging-discharging current in a next preset time period, a current parameter of a battery cell, a predicted ambient temperature in the next preset time period, and a refrigerant returning temperature are acquired. A heat dissipation strategy with minimum total power consumption in the next preset time period is determined based on the charging-discharging current, the current parameter of the battery cell, the predicted ambient temperature, the refrigerant returning temperature and power consumption of the cooling system. The cooling system is controlled based on the heat dissipation strategy with minimum total power consumption, to cool the energy storage system.

18 Claims, 7 Drawing Sheets

(51) Int. Cl.

| | |
|---|---|
| *H01M 10/63* | (2014.01) |
| *H01M 10/6556* | (2014.01) |
| *H01M 10/6567* | (2014.01) |
| *H01M 10/615* | (2014.01) |
| *H01M 10/633* | (2014.01) |
| *H01M 10/6561* | (2014.01) |
| *H01M 10/42* | (2006.01) |

(52) U.S. Cl.
CPC ......... *H01M 10/63* (2015.04); *H01M 10/633* (2015.04); *H01M 10/635* (2015.04); *H01M 10/6556* (2015.04); *H01M 10/6567* (2015.04); *H01M 2010/4271* (2013.01)

(56) References Cited

U.S. PATENT DOCUMENTS

| | | | | |
|---|---|---|---|---|
| 2021/0104788 | A1* | 4/2021 | Shao | H01M 10/613 |
| 2021/0126304 | A1* | 4/2021 | Shao | H01M 10/627 |

FOREIGN PATENT DOCUMENTS

| | | | |
|---|---|---|---|
| CN | 107134604 | A | 9/2017 |
| CN | 107230812 | A | 10/2017 |
| CN | 207459073 | U | 6/2018 |
| CN | 108332463 | A | 7/2018 |
| CN | 108376810 | A | 8/2018 |
| CN | 108400404 | A | 8/2018 |
| CN | 109449528 | A | 3/2019 |
| CN | 109799005 | A | 5/2019 |
| CN | 110254174 | A | 9/2019 |
| CN | 111049273 | A | 4/2020 |
| CN | 210404759 | U | 4/2020 |
| CN | 111641004 | A | 9/2020 |
| CN | 211476360 | U | 9/2020 |
| CN | 111834691 | A | 10/2020 |
| JP | 6071344 | B2 | 2/2017 |
| JP | 2018-536963 | A | 12/2018 |
| KR | 10-2071792 | B1 | 1/2020 |
| KR | 2020-088553 | A | 7/2020 |
| WO | WO 2017/177097 | A1 | 10/2017 |

OTHER PUBLICATIONS

Machine translation of CN 110254174, Sep. 2019.*
Extended European Search Report for European Application No. 21189434.0, dated Feb. 15, 2022.
First Office Action for Chinese Application No. 202011385234.4, dated Sep. 9, 2021.
CN202011385234.4, Sep. 9, 2021, First Office Action.

* cited by examiner

ENERGY STORAGE SYSTEM AND THERMAL MANAGEMENT METHOD FOR THE SAME

The present application claims priority to Chinese Patent Application No. 202011385234.4, titled "ENERGY STORAGE SYSTEM AND THERMAL MANAGEMENT METHOD FOR THE SAME", filed on Dec. 1, 2020 with the China National Intellectual Property Administration, which is incorporated herein by reference in its entirety.

FIELD

The present disclosure relates to the technical field of energy storage, and in particular to an energy storage system and a thermal management method for the energy storage system.

BACKGROUND

With development of energy storage in lithium batteries, a battery system is increasingly large in scale. A box-type energy storage system has power of MWs, and capacity of a battery is 2 MWh and above. Therefore, power consumption of a cooling system in the energy storage system is increasingly large accordingly.

At present, under the demand for energy saving and emission reduction, whether a refrigerant used in the cooling system is gas or liquid, a corresponding device is gradually developing from an asynchronous motor controlled at a fixed frequency to a synchronous motor with direct current frequency conversion. However, after the synchronous motor with direct current frequency conversion is configured, how to control the cooling system in the energy storage system to operate with low power consumption while meeting system requirements is a problem desired to be solved urgently.

SUMMARY

In view of this, an energy storage system and a thermal management method for the energy storage system are provided according to the present disclosure, so that a cooling system in the energy storage system operates with low power consumption while meeting system requirements.

The following technical solutions are provided according to embodiments of the present disclosure.

A thermal management method for an energy storage system is provided according to a first aspect of the present disclosure. The thermal management method is performed by a smart battery thermal management unit in the energy storage system. The thermal management method includes: acquiring a charging-discharging current of a battery system in the energy storage system in a next preset time period via an energy management system (EMS) in the energy storage system; acquiring a current parameter of a battery cell in the battery system, a predicted ambient temperature in the next preset time period, and a refrigerant returning temperature of a cooling system in the energy storage system; determining a heat dissipation strategy with minimum total power consumption based on the charging-discharging current, the current parameter of the battery cell, the predicted ambient temperature, the refrigerant returning temperature and power consumption of the cooling system; and controlling the cooling system based on the heat dissipation strategy with minimum total power consumption, to cool the energy storage system.

In an embodiment, the current parameter of the battery cell includes a current temperature of the battery cell, a current voltage of the battery cell, and an internal resistance of a battery cluster. The internal resistance of the battery cluster is predicted by the smart battery thermal management unit or a direct current to direct current (DCDC) unit corresponding to the battery cluster based on a current state of charge (SOC) of the battery cluster.

In an embodiment, the determining a heat dissipation strategy with minimum total power consumption based on the charging-discharging current, the current parameter of the battery cell, the predicted ambient temperature, the refrigerant returning temperature and power consumption of the cooling system includes: determining heat generation power in the next preset time period based on the charging-discharging current, the current voltage of the battery cell, and the internal resistance of the battery cluster; determining whether to cool or heat the battery system based on the current temperature of the battery cell and the heat generation power, to determine a target temperature range of the battery cell in the next preset time period; and determining the heat dissipation strategy with minimum total power consumption based on the target temperature range of the battery cell, the predicted ambient temperature, the refrigerant returning temperature and the power consumption of the cooling system.

In an embodiment, the determining heat generation power in the next preset time period based on the charging-discharging current, the current voltage of the battery cell, and the internal resistance of the battery cluster includes: selecting the DCDC unit to be operated in the next preset time based on the charging-discharging current, to determine the number of the battery cluster to be operated in the next preset time period; and determining the heat generation power in the next preset time period with the number of the battery cluster to be operated in the next preset time period, the current voltage of the battery cell, and the internal resistance of the battery cluster as an input of a battery heat generation model.

In an embodiment, the controlling the cooling system based on the heat dissipation strategy with minimum total power consumption, to cool the energy storage system includes: controlling the cooling system based on the heat dissipation strategy with minimum total power consumption, to cool the energy storage system, or to cool both the battery system and an electric energy conversion unit in the energy storage system.

In an embodiment, the cooling system is a coolant system, and the refrigerant returning temperature is a temperature of coolant flowing into a coolant device in the coolant system. Alternatively, the cooling system is an air conditioning system, and the refrigerant returning temperature is a temperature of air flowing through an air return inlet of the air conditioning system.

In an embodiment, the cooling system is the coolant system and is for cooling the battery system. The power consumption of the cooling system includes power consumption for internal circulation of the coolant, power consumption for external circulation of the coolant and power consumption for circulation of a cooling agent. In the internal circulation of the coolant, the coolant flows through a cell liquid cooling plate, a plate heat exchanger, a first electromagnetic three-way valve, a first circulation pump and a first heater. In the external circulation of the coolant, the coolant flows through the cell liquid cooling plate, an air-water exchanger and the first electromagnetic three-way valve. In the circulation of the cooling agent, the cooling agent flows through the plate heat exchanger, a compressor and a condenser.

In an embodiment, heat dissipation strategies includes a first strategy including only the internal circulation of the coolant, a second strategy including both the internal circulation of the coolant and operation of the first heater, a third strategy including both the internal circulation of the coolant and the circulation of the cooling agent, and a fourth strategy including only the external circulation of the coolant.

In an embodiment, the first strategy further includes: reducing an operation frequency of the first circulation pump when the current temperature of the battery cell is less than a minimum temperature; and increasing the operation frequency of the first circulation pump when the current temperature of the battery cell is greater than a maximum temperature. The second strategy further includes: activating the first heater when the current temperature of the battery cell is less than the minimum temperature and the predicted ambient temperature is less than a set temperature. The third strategy further includes: reducing an operation frequency of the compressor and an operation frequency of the first circulation pump when the current temperature of the battery cell is less than the minimum temperature; and increasing the operation frequency of the compressor and the operation frequency of the first circulation pump when the current temperature of the battery cell is greater than the maximum temperature. The fourth strategy further includes: reducing an operation frequency of the first circulation pump when the current temperature of the battery cell is less than the minimum temperature; and increasing the operation frequency of the first circulation pump when the current temperature of the battery cell is greater than the maximum temperature.

In an embodiment, the current parameter of the battery cell includes a current temperature of the battery cell, and the determining a heat dissipation strategy with minimum total power consumption based on the charging-discharging current, the current parameter of the battery cell, the predicted ambient temperature, the refrigerant returning temperature and power consumption of the cooling system includes: determining the first strategy as the heat dissipation strategy with minimum total power consumption, if the current temperature of the battery cell is greater than a first temperature threshold and less than a second temperature threshold, or if the current temperature of the battery cell is greater than the second temperature threshold and less than a third temperature threshold and a current charging-discharging current of the battery system is zero, or if the current temperature of the battery cell is greater than the third temperature threshold and the current charging-discharging current is not zero; determining the second strategy as the heat dissipation strategy with minimum total power consumption, if the current temperature of the battery cell is less than the first temperature threshold; determining the third strategy as the heat dissipation strategy with minimum total power consumption, if the current temperature of the battery cell is greater than the second temperature threshold and less than the third temperature threshold, the current charging-discharging current is zero, the charging-discharging current is not zero, and the refrigerant returning temperature does not meet a requirement for cooling the battery cell, or if the current temperature of the battery cell is greater than the second temperature threshold and less than the third temperature threshold, and the current charging-discharging current is not zero, or if the current temperature of the battery cell is greater than the third temperature threshold, the current charging-discharging current is zero, the charging-discharging current is zero, and the refrigerant returning temperature does not meet the requirement for cooling the battery cell; and determining the fourth strategy as the heat dissipation strategy with minimum total power consumption, if the current temperature of the battery cell is greater than the second temperature threshold and less than the third temperature threshold, the current charging-discharging current is zero, the charging-discharging current is not zero, and the refrigerant returning temperature meets the requirement for cooling the battery cell, or if the current temperature of the battery cell is greater than the third temperature threshold and less than a fourth temperature threshold, the current charging-discharging current is zero, the charging-discharging current is zero, and the refrigerant returning temperature meets the requirement for cooling the battery cell.

In an embodiment, after the acquiring a current parameter of a battery cell in the battery system, a predicted ambient temperature in the next preset time period, and a refrigerant returning temperature of a cooling system in the energy storage system, the thermal management method further includes: detecting a thermal runaway a thermal runaway portent in the battery system; determining a heat dissipation strategy with maximum heat dissipation if a thermal runaway portent is detected; and controlling the cooling system based on the heat dissipation strategy with maximum heat dissipation to operate at maximum cooling power, so as to reduce the refrigerant returning temperature.

In an embodiment, the heat dissipation strategy with maximum heat dissipation includes: activating the internal circulation of the coolant and the circulation of the cooling agent, and controlling the compressor and the first circulation pump to operate at a highest frequency.

An energy storage system is provided according to a second aspect of the present disclosure. The energy storage system includes a cooling system, a battery system, an electric energy conversion unit, an EMS, and a smart battery thermal management unit. The EMS is communicatively connected to the electric energy conversion unit and a downstream device of the energy storage system, and is configured to determine a charging-discharging current of the battery system in a next preset time period based on predicted electricity generation power and predicted load power sent by the downstream device. The smart battery thermal management unit is communicatively connected to the EMS, the electric energy conversion unit, an external weather system and the cooling system, and is configured to perform the thermal management method for the energy storage system according to the first aspect of the present disclosure.

In an embodiment, the electric energy conversion unit includes a direct current to alternating current (DCAC) unit, and multiple direct current to direct current (DCDC) units each connected to a direct current side of the DCAC unit. The DCAC unit is communicatively connected to the EMS. Each of the multiple DCDC units is communicatively connected to the smart battery thermal management unit.

In an embodiment, the cooling system is a coolant system and is for cooling the battery system. The cooling system includes a cell liquid cooling plate, a plate heat exchanger, a compressor, a condenser, an air-water exchanger, a first heater, a first circulation pump and a first electromagnetic three-way valve. A first input corner hole of the plate heat exchanger is connected to a first end of the cell liquid cooling plate and a first exchange port of the air-water exchanger, and a first output corner hole of the plate heat exchanger is connected to a first end of the first electromagnetic three-way valve. A second end of the first electromagnetic three-way valve is connected to a second end of the cell liquid cooling plate via the first circulation pump and the first heater. A second input corner hole of the plate heat exchanger is connected to a second output corner hole of the plate heat exchanger via the compressor and the condenser. A third end of the first electromagnetic three-way valve is connected to a second exchange port of the air-water exchanger.

In an embodiment, in internal circulation of a coolant, the coolant flows through the cell liquid cooling plate, the plate heat exchanger, the first electromagnetic three-way valve, the first circulation pump and the first heater. In external circulation of the coolant, the coolant flows through the cell liquid cooling plate, the air-water exchanger, the first electromagnetic three-way valve, the first circulation pump and the first heater. In circulation of a cooling agent, the cooling agent flows through the plate heat exchanger, the compressor and the condenser.

In an embodiment, the smart battery thermal management unit is configured to control the cooling system by controlling: the first electromagnetic three-way valve to switch between the internal circulation and the external circulation of the coolant for the battery system; the first heater to be activated or deactivated; and the first circulation pump and the compressor to be activated or deactivated, and an operation frequency of the first circulating pump and an operation frequency of the compressor.

In an embodiment, the cooling system is further for cooling the electric energy conversion unit. The cooling system further includes a second heater, a second circulation pump, and a second electromagnetic three-way valve. A third exchange port of the air-water exchanger is connected to a first end of the second electromagnetic three-way valve and a first end of a cooling element of the electric energy conversion unit. A fourth exchange port of the air-water exchanger is connected to a second end of the second electromagnetic three-way valve. A third end of the second electromagnetic three-way valve is connected to a second end of the cooling element of the electric energy conversion unit via the second circulation pump and the second heater.

The thermal management method for an energy storage system according to the present disclosure is performed by a smart battery thermal management unit in the energy storage system. With the method, a charging-discharging current in a next preset time period, a current parameter of a battery cell, a predicted ambient temperature in the next preset time period, and a refrigerant returning temperature are acquired. A heat dissipation strategy with minimum total power consumption in the next preset time period is determined based on the charging-discharging current, the current parameter of the battery cell, the predicted ambient temperature, the refrigerant returning temperature and power consumption of the cooling system. The cooling system is controlled based on the heat dissipation strategy with minimum total power consumption, to cool the energy storage system. That is, an optimal heat dissipation strategy in the next preset time period is determined based on the above parameters, and the cooling system is controlled based on the optimal heat dissipation strategy to cool the energy storage system. In this way, an operation state of the cooling system is dynamically adjusted in advance, thereby minimizing auxiliary power supply and overcoming hysteresis in temperature control in the thermal management process.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

A thermal management method for an energy storage system is provided according to an embodiment of the present disclosure, to control a cooling system in the energy storage system to operate with low power consumption while meeting system requirements.

Figure 1:
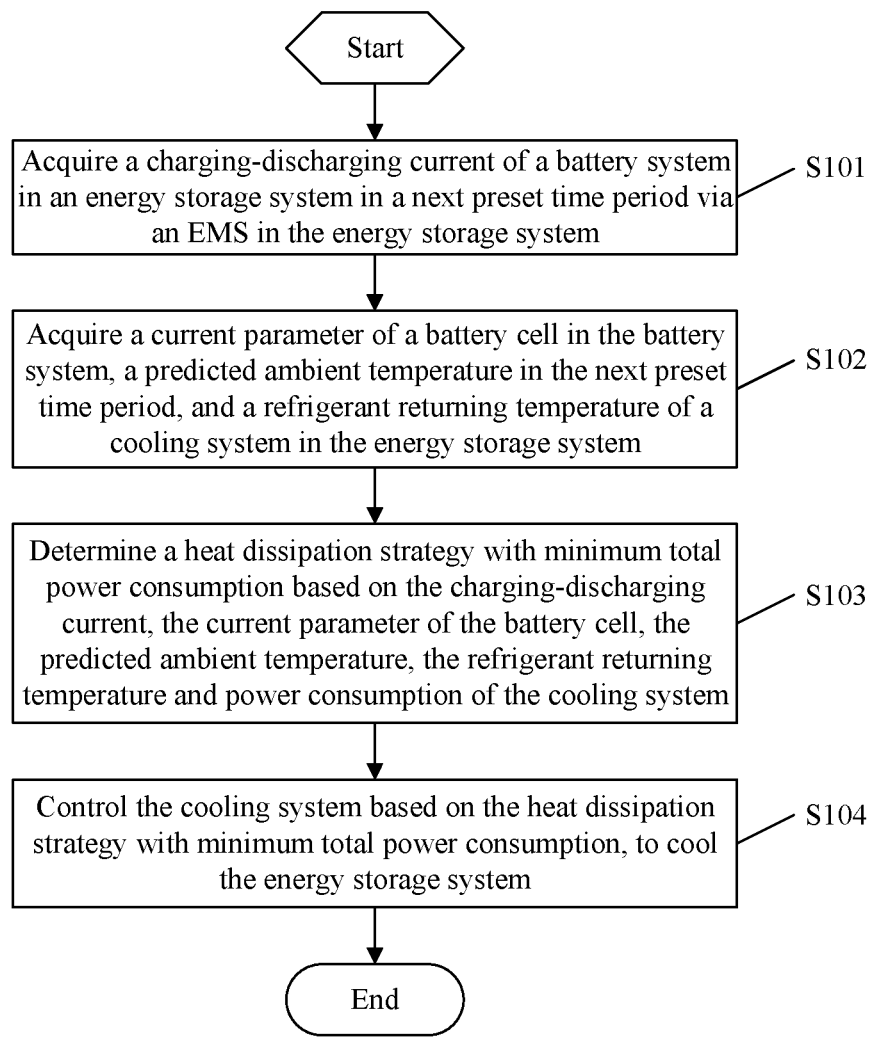
FIG. 1 is a flowchart of a thermal management method for an energy storage system according to an embodiment of the present disclosure.
Figure 5:
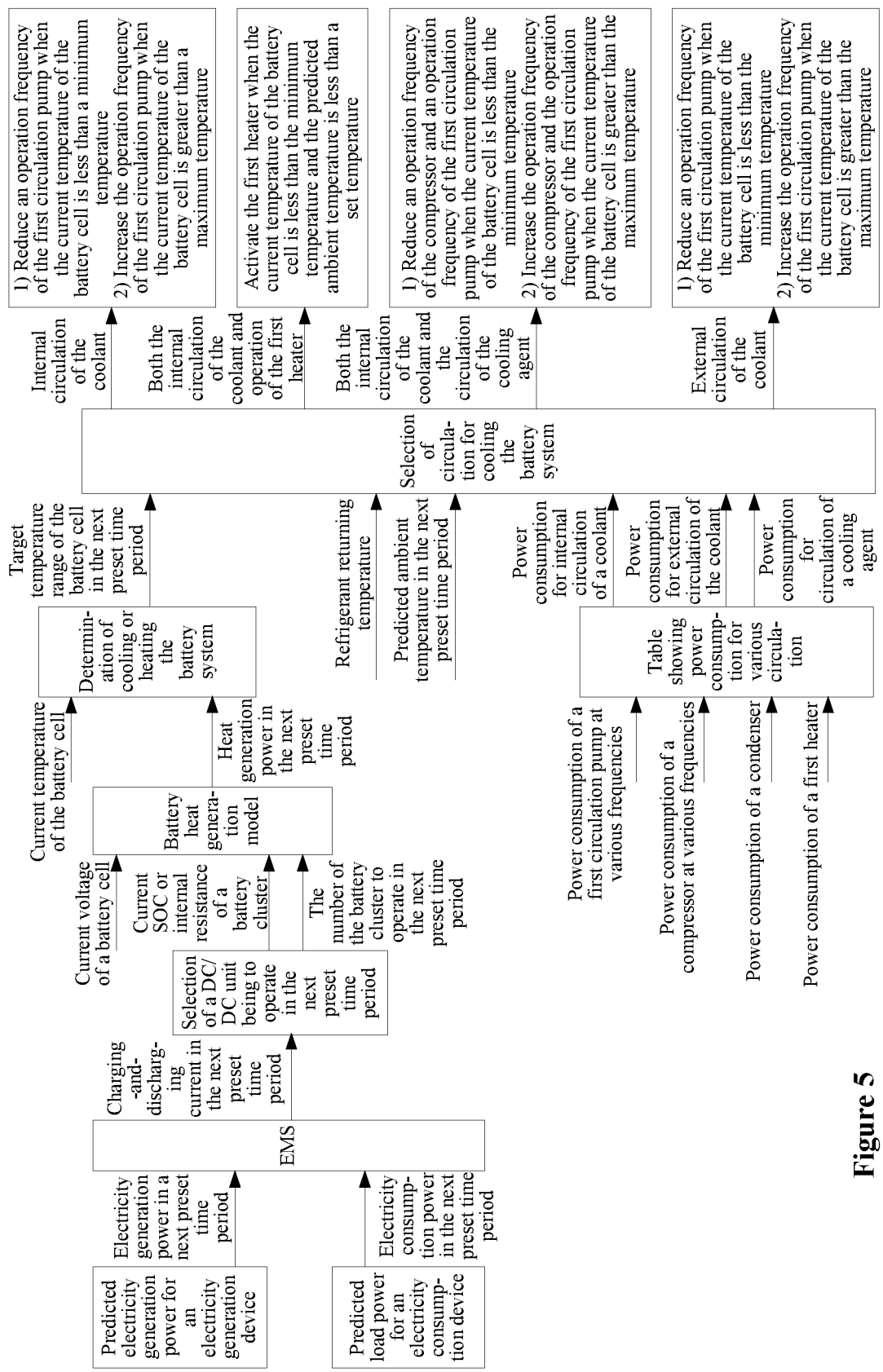
FIG. 5 is a flowchart of a thermal management method for an energy storage system according to another embodiment of the present disclosure.

Reference is made to FIGS. 1 and 5. The thermal management method for the energy storage system is applied to a smart battery thermal management unit in the energy storage system. The method includes the following steps S101 to S104.

In step S101, a charging-discharging current of a battery system in the energy storage system in a next preset time period is acquired via an energy management system (EMS) in the energy storage system.

Figure 6:
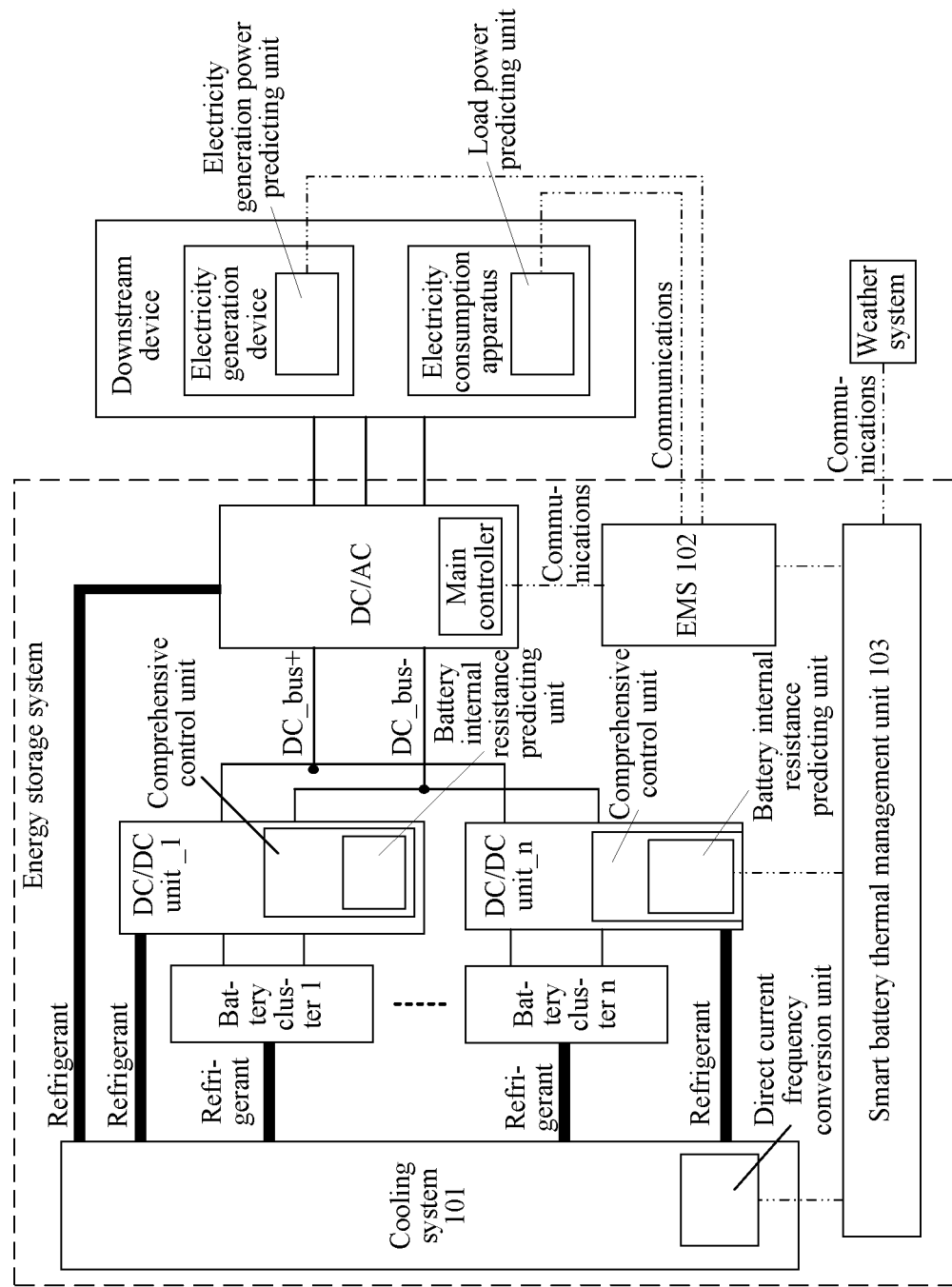
FIG. 6 is a schematic structural diagram of an energy storage system according to an embodiment of the disclosure.

In practice, as shown in FIG. 6, an EMS 102 in the energy storage system is communicably connected to a smart battery thermal management unit 103, so that the smart battery thermal management unit 103 acquires the charging-discharging current of the battery system in the next preset time period via the EMS 102. In an embodiment, the EMS 102 receives predicted electricity generation power sent by an electricity generation power predicting unit in an electricity generation device in a downstream device and predicted load power sent by a load power predicting unit in an electricity consumption device in the downstream device, and integrates the predicted electricity generation power and the predicted load power to determine the charging-discharging current in the next preset time period. For example, the EMS 102 sums the predicted electricity generation power and the predicted load power, to acquire the charging-discharging current during the next preset time period.

The charging-discharging current includes a current characterizing the battery system being charged and a current characterizing the battery system discharging electricity. In a case that the charging-discharging current is equal to zero, the battery system is neither discharging electricity nor being charged. In a case that the charging-discharging current is not equal to zero, whether the battery system is being charged or discharging electricity depends on a definition of the current characterizing the battery system being charged and a definition of the current characterizing the battery system discharging electricity. For example, in a case that the current characterizing the battery system being charged is defined as positive and the current characterizing the battery system discharging electricity is defined as negative, a positive charging-discharging indicates that the battery system is being charged, and a negative charging-discharging indicates that the battery system is discharging electricity.

It should be noted that the preset time period may be a time period of minutes, a time period of ten minutes, or a time period of hours. The preset time period is not limited in the present disclosure, and any suitable time period falls within the protection scope of the present disclosure.

In step S102, a current parameter of a battery cell in the battery system, a predicted ambient temperature in the next preset time period, and a refrigerant returning temperature of the cooling system in the energy storage system are acquired.

The current parameter of the battery cell includes a current temperature of the battery cell, a current voltage of the battery cell, and an internal resistance of a battery cluster.

In practice, the internal resistance of the battery cluster is predicted by the smart battery thermal management unit or a direct current to direct current (DCDC) unit corresponding to the battery cluster based on a current state of charge (SOC) of the battery cluster. As shown in FIG. 6, an internal resistance of a battery cluster connected to a DCDC unit is acquired via a battery internal resistance predicting unit of a comprehensive control unit in the DCDC unit communicatively connected to the smart battery thermal management unit 103.

For details of predicting the internal resistance of the battery cluster based on the current SOC, reference is made to the conventional technology, which are not described herein and fall within the protection scope of the present disclosure.

In practice, a temperature of the battery cell is measured by a temperature sensor, such that the current temperature of the battery cell is acquired. Similarly, a voltage of the battery cell is measured by a voltage sensor, such that the current voltage of the battery cell is acquired. Further, the current temperature and the current voltage of the battery cell are acquired in other manners, which are not limited herein and fall within the protection scope of the present disclosure.

In practice, the cooling system is a coolant system or an air conditioning system. In a case that the cooling system is a coolant system, the refrigerant returning temperature is a temperature of coolant flowing into a coolant device in the coolant system. In a case that the cooling system is an air conditioning system, the refrigerant returning temperature is a temperature of air flowing through an air return inlet of the air conditioning system.

In step S103, a heat dissipation strategy with minimum total power consumption is determined based on the charging-discharging current, the current parameter of the battery cell, the predicted ambient temperature, the refrigerant returning temperature and power consumption of the cooling system.

Figure 2:
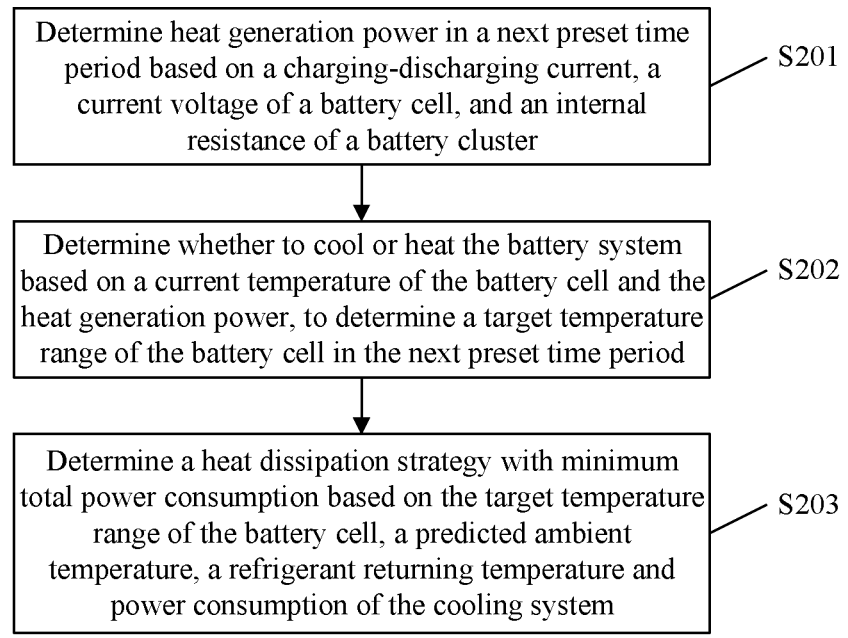
FIG. 2 is a flowchart of a process for determining a heat dissipation strategy with minimum total power consumption according to an embodiment of the present disclosure.

In practice, the heat dissipation strategy with minimum total power consumption is determined based on operation power consumption of the cooling system influence, and impact factors of parameters in the charging-discharging current, the current parameter of the battery cell, the predicted ambient temperature and the refrigerant returning temperature. FIG. 2 shows a process of determining the heat dissipation strategy with minimum total power consumption.

As shown in FIG. 2, the process of determining the heat dissipation strategy with minimum total power consumption includes the following steps S201 to S203.

In step S201, heat generation power of the battery system in the next preset time period is determined based on the charging-discharging current, the current voltage of the battery cell, and the internal resistance of the battery cluster.

Figure 3:
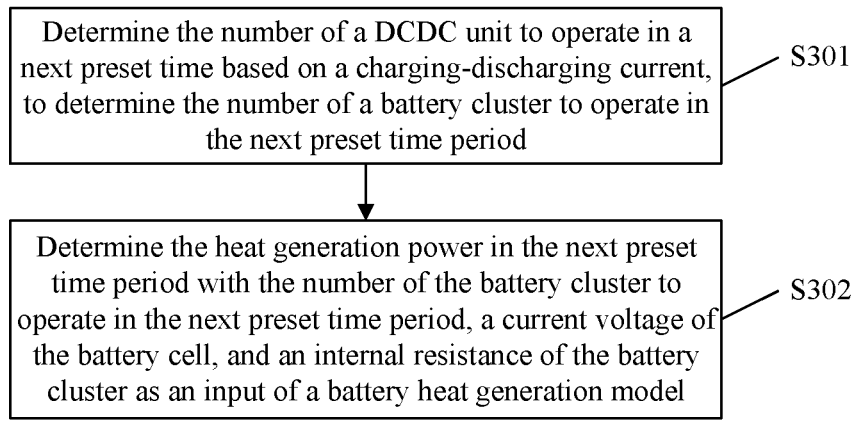
FIG. 3 is a flowchart of a process for determining heat generation power in a next preset time period according to an embodiment of the disclosure.
Figure 4:
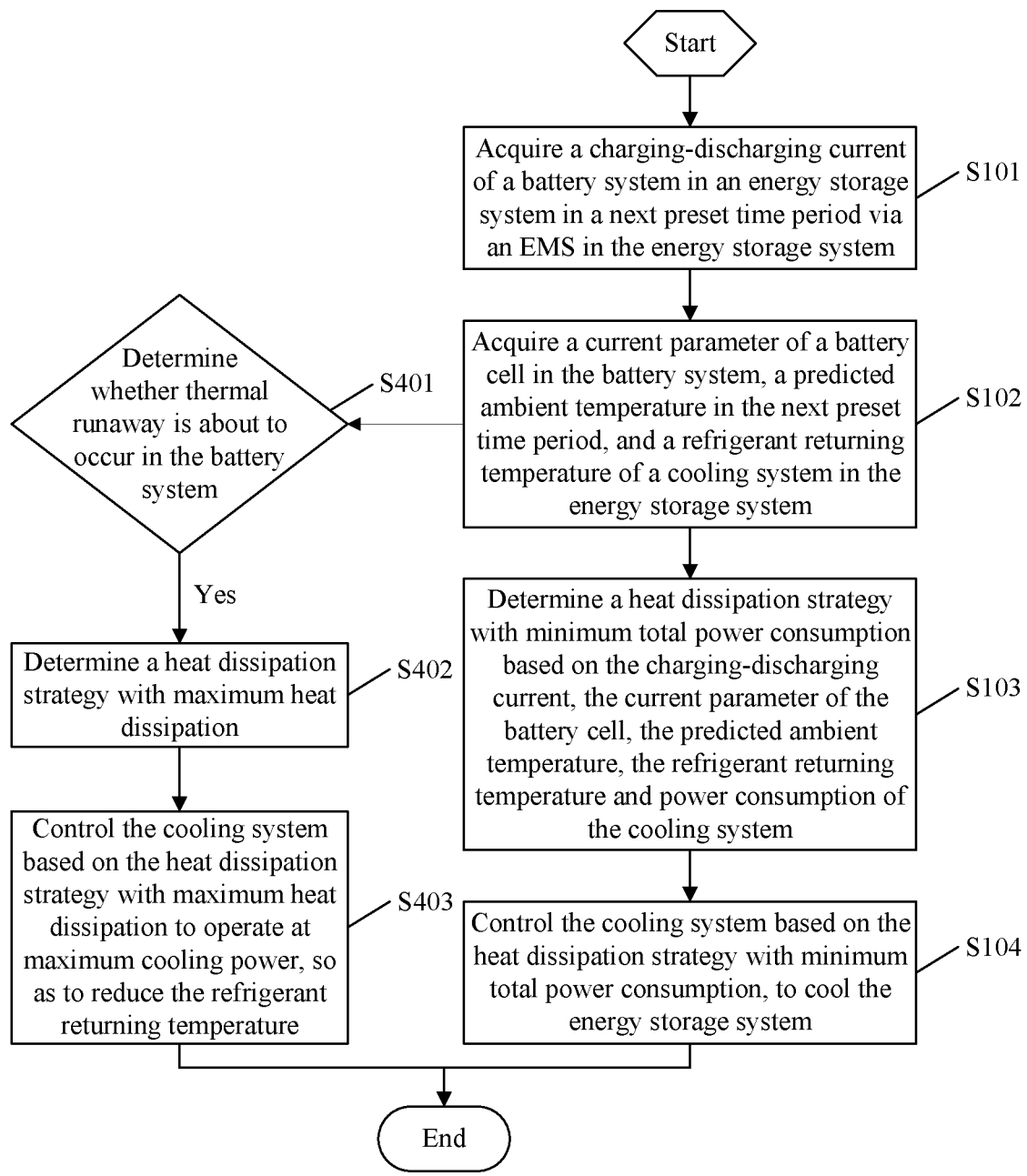
FIG. 4 is a flowchart of a thermal management method for an energy storage system according to another embodiment of the present disclosure.

In practice, impact of the charging-discharging current, the current voltage of the battery cell, and the internal resistance of the battery cluster on the heat generation power of is considered, to determine the heat generation power in the next preset time period based on a solution for calculating heat generation power. In addition, the heat generation power in the next preset time period is also determined by using a battery heat generation model. FIG. 3 shows a process for determining the heat generation power in the next preset time period by using the battery heat generation model.

In step S301, the DCDC unit to operate in the next preset time selected based on the charging-discharging current, to determine the number of the battery cluster to operate in the next preset time period.

In practice, the number of the battery cluster to operate in the next preset time period for achieving the charging-discharging current is determined based on the number of the DCDC unit to operate in the next preset time, so as to optimize conversion efficiency of the battery system.

Alternatively, the number of the DCDC unit to operate in the next preset time period is determined based on other parameter, to determine the number of the battery cluster to operate in the next preset time period, so as to optimize conversion efficiency of the battery system.

In step S302, the heat generation power in the next preset time period is determined with the number of the battery cluster to operate in the next preset time period, the current voltage of the battery cell, and the internal resistance of the battery cluster as an input of the battery heat generation model.

The battery heat generation model is constructed from multiple simulations based on a parameter of the battery system. Alternatively, the battery heat generation model is constructed through a neural network. A manner in which the battery heat generation model is constructed is not limited herein, and any suitable battery heat generation model falls within the protection scope of the present disclosure.

In step S202, it is determined whether to cool or heat the battery system based on the current temperature of the battery cell and the heat generation power, to determine a target temperature range of the battery cell in the next preset time period.

In practice, a temperature range suitable for the battery cell to operate at a certain temperature and certain heat generation power is determined based on a life curve of the battery cell. The life curve shows relationship of a temperature of the battery cell and heat generation power. That is, whether to cool or heat the battery system is determined based on the current temperature of the battery cell and the heat generation power, so as to determine the target temperature range of the battery cell in the next preset time period.

Details for determining the target temperature range of the battery cell in the next preset time period are referred to the following examples, and are not described here.

In step S203, the heat dissipation strategy with minimum total power consumption is determined based on the target temperature range of the battery cell, the predicted ambient temperature, the refrigerant returning temperature and the power consumption of the cooling system.

Figure 7:
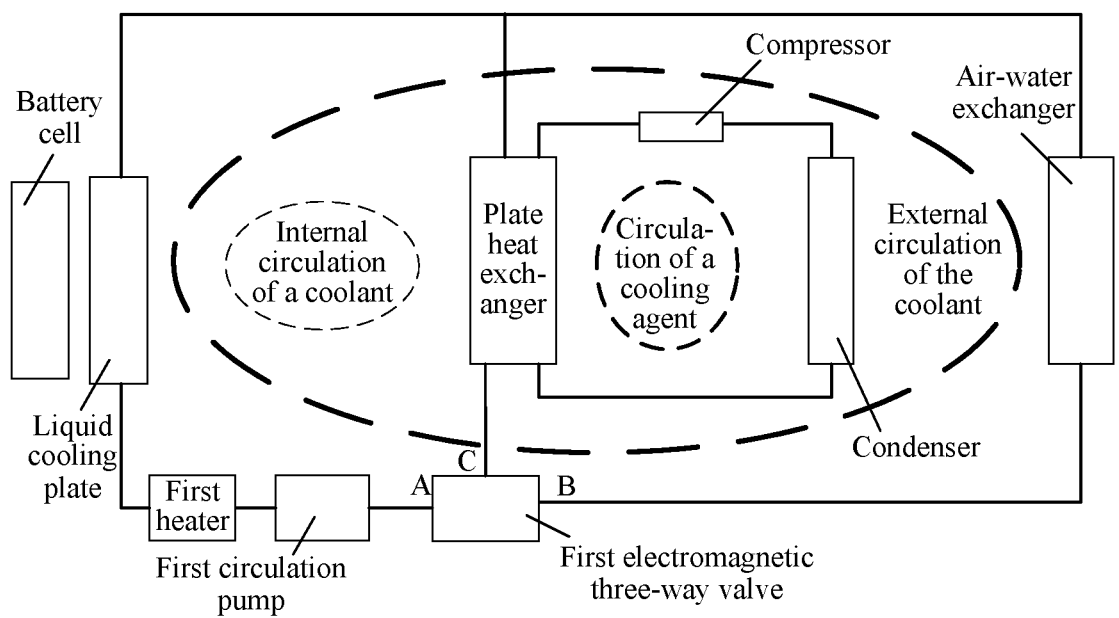
FIG. 7 is a schematic diagram showing a cooling cycle of a cooling system in the energy storage system according to an embodiment of the disclosure.

In practice, as shown in FIG. 7, in a case that the cooling system is a coolant system and is for cooling the battery system, the power consumption of the cooling system includes: power consumption for internal circulation of a coolant, power consumption for external circulation of the coolant, and power consumption for circulation of a cooling agent. In the internal circulation of the coolant, the coolant flows through a cell liquid cooling plate, a plate heat exchanger, a first electromagnetic three-way valve, a first circulation pump and a first heater. In the external circulation of the coolant, the coolant flows through the cell liquid cooling plate, an air-water exchanger and the first electromagnetic three-way valve. In the circulation of the cooling agent, the cooling agent flows through the plate heat exchanger, a compressor and a condenser.

Based on the above power consumption of the cooling system, heat dissipation strategies of the cooling system includes a first strategy including only the internal circulation of the coolant, a second strategy including both the internal circulation of the coolant and operation of the first heater, a third strategy including both the internal circulation of the coolant and the circulation of the cooling agent, and a fourth strategy including only the external circulation of the coolant.

In practice, as shown in FIG. 5, the first strategy further includes: reducing an operation frequency of the first circulation pump when the current temperature of the battery is cell less than a minimum temperature; and increasing the operation frequency of the first circulation pump when the current temperature of the battery cell is greater than a maximum temperature.

In practice, the second strategy further includes: activating the first heater when the current temperature of the battery cell is less than the minimum temperature and the predicted ambient temperature is less than a set temperature.

In practice, the third strategy further includes: reducing an operation frequency of the compressor and an operation frequency of the first circulation pump when the current temperature of the battery cell is less than the minimum temperature; and increasing the operation frequency of the compressor and the operation frequency of the first circulation pump when the current temperature of the battery cell is greater than the maximum temperature.

In practice, the fourth further strategy includes: reducing an operation frequency of the first circulation pump when the current temperature of the battery cell is less than the minimum temperature; and increasing the operation frequency of the first circulation pump when the current temperature of the battery cell is greater than the maximum temperature.

It should be noted that, the minimum temperature and the maximum temperature are determined based on user needs or application scenarios, and are not limited herein. Any suitable minimum temperature and maximum temperature fall within the protection scope of the present disclosure.

Based on the above heat dissipation strategies of the cooling system, step S203 includes the following steps (1) to (4).

In step (1), if the current temperature of the battery cell is greater than a first temperature threshold and less than a second temperature threshold, or if the current temperature of the battery cell is greater than the second temperature threshold and less than a third temperature threshold and a current charging-discharging current of the battery system is zero, or if the current temperature of the battery cell is greater than the third temperature threshold and the current charging-discharging current is not zero, the first strategy is determined as the heat dissipation strategy with minimum total power consumption.

In step (2), if the current temperature of the battery cell is less than the first temperature threshold, the second strategy is determined as the heat dissipation strategy with minimum total power consumption.

In step (3), if the current temperature of the battery cell is greater than the second temperature threshold and less than the third temperature threshold, the current charging-discharging current is zero, the charging-discharging current is not zero, and the refrigerant returning temperature does not meet a requirement for cooling the battery cell, or if the current temperature of the battery cell is greater than the second temperature threshold and less than the third temperature threshold, and the current charging-discharging current is not zero, or if the current temperature of the battery cell is greater than the third temperature threshold, the current charging-discharging current is zero, the charging-discharging current is zero, and the refrigerant returning temperature does not meet the requirement for cooling the battery cell, the third strategy is determined as the heat dissipation strategy with minimum total power consumption.

In step (4), if the current temperature of the battery cell is greater than the second temperature threshold and less than the third temperature threshold, the current charging-discharging current is zero, the charging-discharging current is not zero, and the refrigerant returning temperature meets the requirement for cooling the battery cell, or if the current temperature of the battery cell is greater than the third temperature threshold and less than a fourth temperature threshold, the current charging-discharging current is zero, the charging-discharging current is zero, and the refrigerant returning temperature meets the requirement for cooling the battery cell, the fourth strategy is determined as the heat dissipation strategy with minimum total power consumption.

In practice, the first temperature threshold is less than the second temperature threshold, the second temperature threshold is less than the third temperature threshold, and the third temperature threshold is less than the fourth temperature threshold. For example, the first temperature threshold is set to 10° C., the second temperature threshold is set to 18° C., the third temperature threshold is set to 35° C., and the fourth temperature threshold is set to 45° C. The requirement for cooling the battery cell is that a difference between the current temperature of the battery cell and the predicted ambient temperature is greater than a demand threshold. For example, the demand threshold is set to 5° C.

It should be noted that the first temperature threshold, the second temperature threshold, the third temperature threshold, the fourth temperature threshold, and the demand threshold are not limited to the above, but are determined based on user needs and application scenarios, which are not limited herein, and any suitable first temperature threshold, second temperature threshold, third temperature threshold, fourth temperature threshold, and demand threshold fall within the protection scope of the present disclosure.

Figure 8:
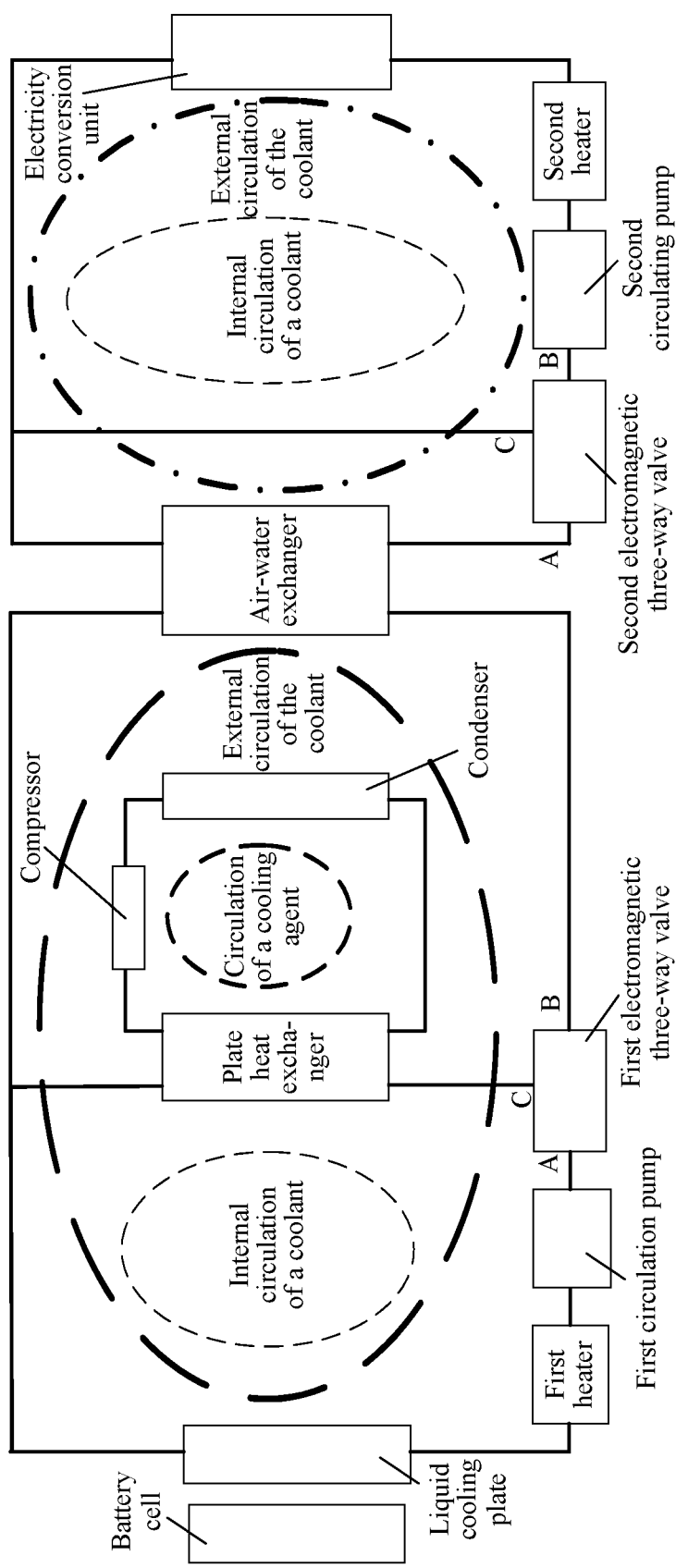
FIG. 8 is a schematic diagram showing a cooling cycle of the cooling system in the energy storage system according to another embodiment of the disclosure.

It should further be noted that in a case that the cooling system is a coolant system and is for cooling both the battery system and an electric energy conversion unit in the energy storage system, as shown in FIG. 8, the power consumption of the cooling system further includes: power consumption for the coolant flowing through a second electromagnetic three-way valve, a second circulation pump, a second heater, and a cooling element of the electric energy conversion unit; and power consumption for the coolant flowing through the air-water exchanger, the second electromagnetic three-way valve, the second circulation pump, the second heater and the cooling element of the electric energy conversion unit.

In step S104, the cooling system is controlled based on the heat dissipation strategy with minimum total power consumption, to cool the energy storage system.

In practice, the cooling system is controlled based on the heat dissipation strategy with minimum total power consumption, to cool the battery system, or to cool both the battery system and the electric energy conversion unit in the energy storage system.

It should be noted that a to-be-cooled object is determined based on user needs or the refrigerant of the cooling system. The to-be-cooled object is not limited herein, and any suitable object falls within the protection scope of the present disclosure.

Based on the above description, a heat dissipation strategy with minimum total power consumption in a next preset time period is determined based on parameters such as the charging-discharging current, the current parameter of the battery cell, the predicted ambient temperature, the refrigerant returning temperature and the power consumption of the cooling system. The cooling system is controlled based on the heat dissipation strategy with minimum total power consumption, to cool the energy storage system, such that an operation state of the cooling system is dynamically adjusted in advance. For example, a direct current frequency conversion device is adjusted to operate at a set frequency, so as to minimize auxiliary power supply and overcome hysteresis in temperature control in the thermal management process.

In practice, in the energy storage system, a temperature suitable for the operation of the electric energy conversion unit is higher than that of the battery system. For example, an insulated gate bipolar transistor (IGBT) in the electric energy conversion unit is controlled to operate at 120° C., which corresponds to water temperature of 50° C. However, a battery in the energy storage system is generally controlled to operate at a temperature ranging from 15° C. to 35° C. Therefore, the electric energy conversion unit and the battery system may share the air-water exchanger, so that the electric energy conversion unit operates in a suitable temperature range.

Similarly, in the case that the cooling system is for cooling the electric energy conversion unit, a heat dissipation strategy with minimum total power consumption for the electric energy conversion unit is determined based on parameter information of the electric energy conversion unit, and the cooling system is controlled to cool the electric energy conversion unit. A process for cooling the electric energy conversion unit is similar to the process for cooling the battery system, and is not described in detail herein.

Based on the thermal management method according to the above embodiment, an illustrative process is provided. For ease of understanding, it is assumed that the cooling system cools only the battery system in the energy storage system. The first temperature threshold is set to 10° C., the second temperature threshold is set to 18° C., the third temperature threshold is set to 35° C., the fourth temperature threshold is set to 45° C., and the preset duration is set to 30 min. With reference to FIG. 7 or FIG. 8, the process includes the following steps 1 to 5.

In step 1, in a case that the current temperature of the battery cell is 8° C., the smart battery thermal management unit controls the first electromagnetic three-way valve to implement the internal circulation of the coolant, the cooling agent does not circulate, and the and the first heater is activated to heat the coolant.

In step 2, in a case that the current temperature of the battery cell is 15° C., the smart battery thermal management unit controls the first electromagnetic three-way valve to implement the internal circulation of the coolant, the cooling agent does not circulate, and the first heater is not activated.

In step 3, in a case that the current temperature of the battery cell is greater than 18° C. and less than 35° C., step 3 includes the following steps 3.1 to 3.3.

In step 3.1, in a case that the current charging-discharging current is zero, that is, the battery system is neither being charged nor discharging electricity, and it is predicted that the battery system is not to be charged or to discharge electricity in half an hour, that is, the charging-discharging current is zero, the smart battery thermal management unit controls the first electromagnetic three-way valve to implement the external circulation of the coolant, and the cooling agent does not circulate, so that the battery system remains in a current temperature range for a long time.

In step 3.2, in a case that the current charging-discharging current is zero, that is, the battery system is neither being charged nor discharging electricity, and it is predicted that the battery system is to be charged or to discharge electricity in half an hour, that is, the charging-discharging current is not zero, step 3.2 includes the following steps 3.2.1 to 3.2.2.

In step 3.2.1, in a case that the predicted ambient temperature is 6° C. lower than the current temperature of the battery cell, that is, the requirement for cooling the battery cell is met, the smart battery thermal management unit controls the first electromagnetic three-way valve to implement the external circulation of the coolant, and the cooling agent does not circulate. The temperature of water is stabilized by controlling an operation frequency of the first circulation pump, to cool the battery system, so that the battery system operates at a target temperature ranging from 18° C. to 25° C.

In step 3.2.2, in a case that the predicted ambient temperature is not lower than the current temperature of the battery cell, that is, the requirement for cooling the battery cell is not met, the smart battery thermal management unit controls the first electromagnetic three-way valve to implement the internal circulation of the coolant, and the cooling agent circulates. The temperature of water is stabilized by controlling an operation frequency of the first circulation pump and an operation frequency of the compressor, to cool the battery system, so that the battery system operates at a target temperature ranging from 18° C. to 25° C.

In step 3.3, in a case that the current charging-discharging current is not zero, that is, the battery system is being charged or discharging electricity, the smart battery thermal management unit controls the first electromagnetic three-way valve to implement the internal circulation of the coolant, and the cooling agent circulates. The temperature of water is stabilized by controlling an operation frequency of the first circulation pump and an operation frequency of the compressor, to cool the battery system, so that the battery system operates at a target temperature ranging from 18° C. to 35° C.

In step 4, in a case that the current temperature of the battery cell is greater than 35° C. and less than 45° C., step 4 includes the following steps 4.1 to 4.3.

In step 4.1, in a case that the current charging-discharging current is zero, that is, the battery system is neither being charged nor discharging electricity, and it is predicted that the battery system is neither to be charged nor to discharge electricity in half an hour, that is, the charging-discharging current is zero, step 4.1 includes the following steps 4.1.1 to 4.1.2.

In step 4.1.1, in a case that the predicted ambient temperature is 6° C. lower than the current temperature of the battery cell, that is, the requirement for cooling the battery cell is met, the smart battery thermal management unit controls the first electromagnetic three-way valve to implement the external circulation of the coolant. The temperature of water is stabilized by controlling an operation frequency of the first circulation pump, to cool the battery system, so that the battery system operates at a target temperature ranging from 18° C. to 35° C.

In step 4.1.2, in a case that the predicted ambient temperature is not lower than the current temperature of the battery cell, that is, the requirement for cooling the battery cell is not met, the smart battery thermal management unit controls the first electromagnetic three-way valve to implement the internal circulation of the coolant, and the cooling agent circulates. The temperature of water is stabilized by controlling an operation frequency of the first circulation pump and an operation frequency of the compressor, to cool the battery system, so that the battery system operates at a target temperature ranging from 18° C. to 25° C.

In step 4.2, in a case that the current charging-discharging current is not zero, that is, the battery system is being charged or discharging electricity, and it is predicted that the battery system is neither to be charged nor to discharge electricity in half an hour, that is, the charging-discharging current is zero, the smart battery thermal management unit controls the first electromagnetic three-way valve to implement the internal circulation of the coolant. The temperature of water is stabilized by controlling an operation frequency of the first circulation pump, to cool the battery system, so that the battery system operates at a target temperature ranging from 18° C. to 35° C.

In step 4.3, in a case that the current charging-discharging current is not zero, that is, the battery system is being charged or discharging electricity, and it is predicted that the battery system is to be charged or to discharge electricity in half an hour, that is, the charging-discharging current is not zero, the smart battery thermal management unit controls the first electromagnetic three-way valve to implement the internal circulation of the coolant. The temperature of water is stabilized by controlling an operation frequency of the first circulation pump, to cool the battery system, so that the battery system operates at a target temperature ranging from 18° C. to 25° C.

In step 5, in a case that the current temperature of the battery cell is greater than 45° C., step 5 includes the following steps 5.1 to 5.3.

In step 5.1, in a case that the current charging-discharging current is zero, that is, the battery system is neither being charged nor discharging electricity, and it is predicted that the battery system is neither to be charged nor to discharge electricity in half an hour, that is, the charging-discharging current is zero, step 5.1 includes the following steps 5.1.1 to 5.1.2.

In step 5.1.1, in a case that the predicted ambient temperature is 6° C. lower than the current temperature of the battery cell, that is, the requirement for cooling the battery cell is met, the smart battery thermal management unit controls the first electromagnetic three-way valve to implement the external circulation of the coolant. The temperature of water is stabilized by controlling an operation frequency of the first circulation pump, to cool the battery system, so that the battery system operates at a target temperature ranging from 18° C. to 35° C.

In step 5.1.2, in a case that the predicted ambient temperature is not lower than the current temperature of the battery cell, that is, the requirement for cooling the battery cell is not met, the smart battery thermal management unit controls the first electromagnetic three-way valve to implement the internal circulation of the coolant, and the cooling agent circulates. The temperature of water is stabilized by controlling an operation frequency of the first circulation pump and an operation frequency of the compressor, to cool the battery system, so that the battery system operates at a target temperature ranging from 18° C. to 25° C.

In step 5.2, in a case that the current charging-discharging current is not zero, that is, the battery system is being charged or discharging electricity, and it is predicted that the battery system is neither to be charged nor to discharge electricity in half an hour, that is, the charging-discharging current is zero, the smart battery thermal management unit controls the first electromagnetic three-way valve to implement the internal circulation of the coolant. The temperature of water is stabilized by controlling an operation frequency of the first circulation pump, to cool the battery system, so that the battery system operates at a target temperature ranging from 18° C. to 35° C.

In step 5.3, in a case that the current charging-discharging current is not zero, that is, the battery system is being charged or discharging electricity, and it is predicted that the battery system is to be charged or to discharge electricity in half an hour, that is, the charging-discharging current is not zero, the smart battery thermal management unit controls the first electromagnetic three-way valve to implement the internal circulation of the coolant. The temperature of water is stabilized by controlling an operation frequency of the first circulation pump, to cool the battery system, so that the battery system operates at a target temperature ranging from 18° C. to 25° C.

It should be noted that only the illustrative process is described herein. In practice, depending on the specific application scenarios, the thermal management method further includes other processes, which all fall within the protection scope of the present disclosure.

In practice, in a case that a temperature of a part inside the battery system or the temperature of the battery system rises rapidly, heat cannot be dissipated timely and accumulates inside the energy storage system, resulting in thermal runaway of the battery system, which causes irreversible damage to the battery system.

Therefore, in another embodiment of the present disclosure, after step S102, the thermal management method further includes the following steps S401 to S403.

In step S401, a thermal runaway portent in the battery system detected.

In practice, the thermal runaway portent is detected in an existing manner.

For example, the thermal runaway portent is detected based on parameters such as an internal resistance, a capacity, a temperature, and a temperature change rate of the battery cell in the battery system. The manner in which the thermal runaway portent is detected is not limited herein, and any suitable manner falls within the protection scope of the present disclosure.

If a thermal runaway portent is detected, step S402 is performed.

In step S402, a heat dissipation strategy with maximum heat dissipation is determined.

In practice, the heat dissipation strategy with maximum heat dissipation includes: activating the internal circulation of the coolant and the circulation of the cooling agent, and controlling the compressor and the first circulation pump to operate at a highest frequency. In a case that the cooling system is an air conditioning system, the heat dissipation strategy with maximum heat dissipation includes: controlling the air conditioning system to operate at maximum cooling power.

Similarly, in a case that the cooling system is other existing system, the heat dissipation strategy with maximum heat dissipation includes: controlling the existing system to operate at maximum cooling power. The heat dissipation strategy with maximum heat dissipation is not limited herein, and any suitable strategy falls within the protection scope of the present disclosure.

In step S403, the cooling system is controlled based on the heat dissipation strategy with maximum heat dissipation, to operate at maximum cooling power, so as to reduce the refrigerant returning temperature.

In the embodiment, when a thermal runaway portent is detected, the cooling system is controlled based on the heat dissipation strategy with maximum heat dissipation, to operate at the maximum cooling power, so as to reduce a temperature of water in the cooling system in advance. For example, the temperature of water in the cooling system is controlled to be a temperature ranging from 0° C. to 5° C., to maximize heat dissipation, so as to reduce an internal temperature of the battery cell, thereby avoiding or delaying the thermal runaway. In this way, a probability of using another electrical safety device is increased, thereby avoiding deterioration of a fault.

Based on the above thermal management method for an energy storage system, an energy storage system is provided according to another embodiment of the present disclosure. As shown in FIG. 6, the energy storage system includes a cooling system 101, a battery system (including a battery cluster 1 to a battery cluster n), an electric energy conversion unit (including DCDC 1 to DCDC n, and DC/AC), an energy management system (EMS) 102, and a smart battery thermal management unit 103.

The EMS 102 is communicatively connected to the electric energy conversion unit and a downstream device of the energy storage system, and is configured to determine a charging-discharging current of the battery system in a next preset time period based on predicted electricity generation power and predicted load power sent by the downstream device.

In practice, the predicted electricity generation power is acquired by an electricity generation power predicting unit in an electricity generation device in the downstream device. The predicted load power is acquired by a load power predicting unit in an electricity consumption device in the downstream device.

The downstream device of the energy storage system is a device that is arranged at an energy output port of the energy storage system and acquires electricity from the energy storage system, such as an energy storage converter. The downstream device of the energy storage system is not limited thereto, and any suitable device falls within the protection scope of the present disclosure.

The smart battery thermal management unit 103 is communicatively connected to the EMS 102, the electric energy conversion unit, an external weather system and the cooling system 101, and is configured to perform the thermal management method for the energy storage system according to any one of the above embodiments.

In practice, the external weather system is a local weather system. Weather forecast information in a next preset time period is acquired by the weather system. The weather forecast information includes a predicted ambient temperature and predicted ambient humidity.

As shown in FIG. 6, the electric energy conversion unit includes a direct current to alternating current (DCAC) unit, and multiple direct current to direct current (DCDC) units (including a DCDC unit_1 to a DCDC unit_n as shown in FIG. 6). The multiple DCDC units each are connected to a direct current side of the DCAC unit via a positive end DC_bus+ of a direct current bus and a negative end DC_bus− of the direct current bus. The DCAC unit is communicatively connected to the EMS 102. The multiple DCDC units each are communicatively connected to the smart battery thermal management unit 103.

Specifically, for each of the multiple DCDC units, a battery internal resistance predicting unit of a comprehensive control unit in the DCDC unit is communicatively connected to the smart battery thermal management unit 103. The battery internal resistance predicting unit is configured to predict a battery internal resistance of a battery cluster connected to the DCDC unit.

In practice, as shown in FIG. 7, in a case that the cooling system 101 is a coolant system and is for cooling only the battery system, the cooling system 101 includes a cell liquid cooling plate, a plate heat exchanger, a compressor, a condenser, an air-water exchanger, a first heater, a first circulation pump and a first electromagnetic three-way valve.

In practice, the plate heat exchanger includes four corner holes. A first input corner hole corresponds to a first output corner hole, and a second input corner hole corresponds to a second output corner hole.

As shown in FIG. 6, the first input corner hole of the plate heat exchanger is connected to a first end of the cell liquid cooling plate and a first exchange port of the air-water exchanger. The first output corner hole of the plate heat exchanger is connected to a first end C of the first electromagnetic three-way valve.

A second end A of the first electromagnetic three-way valve is connected to a second end of the cell liquid cooling plate via the first circulation pump and the first heater.

The second input corner hole of the plate heat exchanger is connected to the second output corner hole of the plate heat exchanger via the compressor and the condenser.

A third end B of the first electromagnetic three-way valve is connected to a second exchange port of the air-water exchanger.

As shown in FIG. 6 or FIG. 7, in the case that the cooling system 101 is a coolant system and is for cooling only the battery system, in internal circulation of a coolant, the coolant flows through the cell liquid cooling plate, the plate heat exchanger, the first electromagnetic three-way valve, the first circulation pump and the first heater. In external circulation of the coolant, the coolant flows through the cell liquid cooling plate, the air-water exchanger, the first electromagnetic three-way valve, the first circulation pump and the first heater. In circulation of a cooling agent, the cooling agent flows through the plate heat exchanger, the compressor and the condenser.

In practice, the smart battery thermal management unit 103 controlling the cooling system 101 includes that: the smart battery thermal management unit 103 controls the first electromagnetic three-way valve to switch between the internal circulation and the external circulation of the coolant for the battery system; the smart battery thermal management unit 103 controls the first heater to be activated or deactivated; and the smart battery thermal management unit 103 controls the first circulation pump and the compressor to be activated or deactivated, and controls an operation frequency of the first circulating pump and an operation frequency of the compressor.

It should be noted that for details of a thermal management method for the energy storage system, reference is made to the above method embodiment. Therefore, details of the thermal management method for the energy storage system is not described here.

With the energy storage system according to the embodiment, parameters for determining an optimal heat dissipation strategy in a next preset time period are acquired from a unit or device of the energy storage system by the smart battery thermal management unit. The thermal management method is performed based on these parameters, such that an operation state of the cooling system is dynamically adjusted in advance. For example, a direct current frequency conversion device is adjusted to operate at a set frequency, so as to minimize power consumption of the cooling system for heat dissipation, minimize auxiliary power supply and overcome hysteresis in temperature control in the thermal management process.

In an embodiment, as shown in FIG. 6, the cooling system is for cooling both the battery system and the electric energy conversion unit. In this case, as shown in FIG. 8, the cooling system 101 further includes a second heater, a second circulation pump, and a second electromagnetic three-way valve.

A third exchange port of the air-water exchanger is connected to a first end C of the second electromagnetic three-way valve and a first end of a cooling element of the electric energy conversion unit.

A fourth exchange port of the air-water exchanger is connected to a second end A of the second electromagnetic three-way valve.

A third end B of the second electromagnetic three-way valve is connected to a second end of the cooling element of the electric energy conversion unit via the second circulation pump and the second heater.

In practice, when the cooling system cools the electric energy conversion unit, in internal circulation of the coolant, the coolant flows through the second electromagnetic three-way valve, the second circulation pump, the second heater, and the cooling element of the electric energy conversion unit. In internal circulation of the coolant, the coolant flows through the air-water exchanger, the second electromagnetic three-way valve, the second circulation pump, the second heater and the cooling element of the electric energy conversion unit.

It should be noted that details of the energy storage system can refer to the existing technology, and are not described in detail herein.

The features described in the embodiments according to the present disclosure may be replaced or combined with each other. The same or similar parts among the embodiments can be referred to each other. Each of the embodiments emphasizes the differences from others. In particular, since the system or system embodiment are basically similar to the method or method embodiment, the description thereof is relatively simple, and for relevant matters, reference may be made to the description of the method. The system and embodiments of the system described above are only illustrative. Units described as separate components may be or may not be physically separate. Components shown as units may be or may not be physical units, that is, may be located in one place or may be distributed to multiple network units. Some or all of the modules may be selected to implement the embodiments of the present disclosure according to actual requirements. Those skilled in the art may understand and implement the embodiments of the present disclosure without any creative work.

Those skilled in the art should further understand that units and steps described in combination with the disclosed embodiments may be implemented by electronic hardware, computer software or a combination thereof. In order to clearly describe interchangeability of the hardware and the software, the units and steps in each embodiment are generally described above based on functions. Whether the functions are implemented by the hardware or the software is determined by specific applications of the technical solutions and design constraints. For each of the specific applications, those skilled in the art may select a specific implementation to realize the functions described above, and the implementation should fall within the scope of the present disclosure.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

It should further be noted that, the relationship terms such as "first", "second" herein are only to distinguish one entity or operation from another, rather than to necessitate or imply that an actual relationship or order exists between the entities or operations. Furthermore, terms such as "include", "comprise" or any other variants thereof are non-exclusive. Therefore, a process, method, article or device including a series of elements include not only the disclosed elements but also other elements that are not clearly enumerated, or further include elements inherent to the process, method, article or device. Unless expressively limited otherwise, the statement "comprising (including) one . . . " does not exclude a case that the process, method, article or device further includes other similar elements.

The invention claimed is:

1. A thermal management method for an energy storage system, wherein the thermal management method is performed by a smart battery thermal management unit in the energy storage system, and the thermal management method comprises:
    acquiring a charging-discharging current of a battery system in the energy storage system in a next preset time period via an energy management system (EMS) in the energy storage system;
    acquiring a current parameter of a battery cell in the battery system, a predicted ambient temperature in the next preset time period, and a refrigerant returning temperature of a cooling system in the energy storage system;
    determining a heat dissipation strategy with minimum total power consumption based on the charging-discharging current, the current parameter of the battery cell, the predicted ambient temperature, the refrigerant returning temperature and power consumption of the cooling system; and
    controlling the cooling system based on the heat dissipation strategy with minimum total power consumption, to cool the energy storage system.

2. The thermal management method for an energy storage system according to claim 1, wherein the current parameter of the battery cell comprises a current temperature of the battery cell, a current voltage of the battery cell, and an internal resistance of a battery cluster, wherein the internal resistance of the battery cluster is predicted by the smart battery thermal management unit or a direct current to direct current (DCDC) unit corresponding to the battery cluster based on a current state of charge (SOC) of the battery cluster.

3. The thermal management method for an energy storage system according to claim 2, wherein the determining a heat dissipation strategy with minimum total power consumption based on the charging-discharging current, the current parameter of the battery cell, the predicted ambient temperature, the refrigerant returning temperature and power consumption of the cooling system comprises:
    determining heat generation power in the next preset time period based on the charging-discharging current, the current voltage of the battery cell, and the internal resistance of the battery cluster;
    determining whether to cool or heat the battery system based on the current temperature of the battery cell and the heat generation power, to determine a target temperature range of the battery cell in the next preset time period; and
    determining the heat dissipation strategy with minimum total power consumption based on the target temperature range of the battery cell, the predicted ambient temperature, the refrigerant returning temperature and the power consumption of the cooling system.

4. The thermal management method for an energy storage system according to claim 3, wherein the determining heat generation power in the next preset time period based on the charging-discharging current, the current voltage of the battery cell, and the internal resistance of the battery cluster comprises:
    selecting the DCDC unit to be operated in the next preset time based on the charging-discharging current, to determine the number of the battery cluster to be operated in the next preset time period; and
    determining the heat generation power in the next preset time period with the number of the battery cluster to be operated in the next preset time period, the current voltage of the battery cell, and the internal resistance of the battery cluster as an input of a battery heat generation model.

5. The thermal management method for an energy storage system according to claim 1, wherein the controlling the cooling system based on the heat dissipation strategy with minimum total power consumption, to cool the energy storage system comprises:
    controlling the cooling system based on the heat dissipation strategy with minimum total power consumption, to cool the energy storage system, or to cool both the battery system and an electric energy conversion unit in the energy storage system.

6. The heat management method for an energy storage system according to claim 5, wherein
    the cooling system is a coolant system, and the refrigerant returning temperature is a temperature of coolant flowing into a coolant device in the coolant system; or
    the cooling system is an air conditioning system, and the refrigerant returning temperature is a temperature of air flowing through an air return inlet of the air conditioning system.

7. The thermal management method for an energy storage system according to claim 6, wherein the cooling system is the coolant system and is for cooling the battery system, wherein the power consumption of the cooling system comprises:
    power consumption for internal circulation of the coolant, wherein in the internal circulation of the coolant, the coolant flows through a cell liquid cooling plate, a plate heat exchanger, a first electromagnetic three-way valve, a first circulation pump and a first heater;
    power consumption for external circulation of the coolant, wherein in the external circulation of the coolant, the coolant flows through the cell liquid cooling plate, an air-water exchanger and the first electromagnetic three-way valve; and
    power consumption for circulation of a cooling agent, wherein in the circulation of the cooling agent, the cooling agent flows through the plate heat exchanger, a compressor and a condenser.

8. The thermal management method for an energy storage system according to claim 7, wherein the heat dissipation strategy is selected from:
    a first strategy comprising the internal circulation of the coolant;
    a second strategy comprising both the internal circulation of the coolant and operation of the first heater;
    a third strategy comprising both the internal circulation of the coolant and the circulation of the cooling agent; and
    a fourth strategy comprising only the external circulation of the coolant.

9. The thermal management method for an energy storage system according to claim 8, wherein
    the first strategy further comprises: reducing an operation frequency of the first circulation pump when the current temperature of the battery cell is less than a minimum temperature; and
    increasing the operation frequency of the first circulation pump when the current temperature of the battery cell is greater than a maximum temperature;
    the second strategy further comprises: activating the first heater when the current temperature of the battery cell is less than the minimum temperature and the predicted ambient temperature is less than a set temperature;

the third strategy further comprises: reducing an operation frequency of the compressor and an operation frequency of the first circulation pump when the current temperature of the battery cell is less than the minimum temperature; and increasing the operation frequency of the compressor and the operation frequency of the first circulation pump when the current temperature of the battery cell is greater than the maximum temperature; and the fourth strategy further comprises: reducing an operation frequency of the first circulation pump when the current temperature of the battery cell is less than the minimum temperature; and increasing the operation frequency of the first circulation pump when the current temperature of the battery cell is greater than the maximum temperature.

10. The thermal management method for an energy storage system according to claim 9, wherein the current parameter of the battery cell comprises a current temperature of the battery cell, wherein the determining a heat dissipation strategy with minimum total power consumption based on the charging-discharging current, the current parameter of the battery cell, the predicted ambient temperature, the refrigerant returning temperature and power consumption of the cooling system comprises:

determining the first strategy as the heat dissipation strategy with minimum total power consumption, if the current temperature of the battery cell is greater than a first temperature threshold and less than a second temperature threshold, or if the current temperature of the battery cell is greater than the second temperature threshold and less than a third temperature threshold and a current charging-discharging current of the battery system is zero, or if the current temperature of the battery cell is greater than the third temperature threshold and the current charging-discharging current is not zero;

determining the second strategy as the heat dissipation strategy with minimum total power consumption, if the current temperature of the battery cell is less than the first temperature threshold;

determining the third strategy as the heat dissipation strategy with minimum total power consumption, if the current temperature of the battery cell is greater than the second temperature threshold and less than the third temperature threshold, the current charging-discharging current is zero, the charging-discharging current is not zero, and the refrigerant returning temperature does not meet a requirement for cooling the battery cell, or if the current temperature of the battery cell is greater than the second temperature threshold and less than the third temperature threshold, and the current charging-discharging current is not zero, or if the current temperature of the battery cell is greater than the third temperature threshold, the current charging-discharging current is zero, the charging-discharging current is zero, and the refrigerant returning temperature does not meet the requirement for cooling the battery cell; and determining the fourth strategy as the heat dissipation strategy with minimum total power consumption, if the current temperature of the battery cell is greater than the second temperature threshold and less than the third temperature threshold, the current charging-discharging current is zero, the charging-discharging current is not zero, and the refrigerant returning temperature meets the requirement for cooling the battery cell, or if the current temperature of the battery cell is greater than the third temperature threshold and less than a fourth temperature threshold, the current charging-discharging current is zero, the charging-discharging current is zero, and the refrigerant returning temperature meets the requirement for cooling the battery cell.

11. The thermal management method for an energy storage system according to claim 7, wherein after the acquiring a current parameter of a battery cell in the battery system, a predicted ambient temperature in the next preset time period, and a refrigerant returning temperature of a cooling system in the energy storage system, the thermal management method further comprises:

detecting a thermal runaway portent in the battery system;

determining a heat dissipation strategy with maximum heat dissipation if a thermal runaway portent is detected; and controlling the cooling system based on the heat dissipation strategy with maximum heat dissipation to operate at maximum cooling power, so as to reduce the refrigerant returning temperature.

12. The thermal management method for the energy storage system according to claim 11, wherein the heat dissipation strategy with maximum heat dissipation comprises: activating the internal circulation of the coolant and the circulation of the cooling agent, and controlling the compressor and the first circulation pump to operate at a highest frequency.

13. An energy storage system, comprising:
a cooling system;
a battery system;
an electric energy conversion unit;
an energy management system (EMS); and
a smart battery thermal management unit; wherein
the EMS is communicatively connected to the electric energy conversion unit and a downstream device of the energy storage system, and is configured to determine a charging-discharging current of the battery system in a next preset time period based on predicted electricity generation power and predicted load power sent by the downstream device; and
the smart battery thermal management unit is communicatively connected to the EMS, the electric energy conversion unit, an external weather system and the cooling system, and is configured to perform the thermal management method for the energy storage system according to claim 1.

14. The energy storage system according to claim 13, wherein the electric energy conversion unit comprises:
a direct current to alternating current (DCAC) unit; and
a plurality of direct current to direct current (DCDC) units each connected to a direct current side of the DCAC unit, wherein
the DCAC unit is communicatively connected to the EMS; and
each of the plurality of DCDC units is communicatively connected to the smart battery thermal management unit.

15. The energy storage system according to claim 13, wherein the cooling system is a coolant system and is configured to cool the battery system, wherein the cooling system comprises a cell liquid cooling plate, a plate heat exchanger, a compressor, a condenser, an air-water exchanger, a first heater, a first circulation pump and a first electromagnetic three-way valve, wherein a first input corner hole of the plate heat exchanger is connected to a first end of the cell liquid cooling plate and a first exchange port of the air-water exchanger, and a first output corner hole of the plate heat exchanger is connected to a first end of the first electromagnetic three-way valve;

a second end of the first electromagnetic three-way valve is connected to a second end of the cell liquid cooling plate via the first circulation pump and the first heater;

a second input corner hole of the plate heat exchanger is connected to a second output corner hole of the plate heat exchanger via the compressor and the condenser; and a third end of the first electromagnetic three-way valve is connected to a second exchange port of the air-water exchanger.

16. The energy storage system according to claim 15, wherein in internal circulation of a coolant, the coolant flows through the cell liquid cooling plate, the plate heat exchanger, the first electromagnetic three-way valve, the first circulation pump and the first heater;

in external circulation of the coolant, the coolant flows through the cell liquid cooling plate, the air-water exchanger, the first electromagnetic three-way valve, the first circulation pump and the first heater; and in circulation of a cooling agent, the cooling agent flows through the plate heat exchanger, the compressor and the condenser.

17. The energy storage system of claim 16, wherein the smart battery thermal management unit is configured to control the cooling system by controlling:

the first electromagnetic three-way valve to switch between the internal circulation and the external circulation of the coolant for the battery system;

the first heater to be activated or deactivated; and the first circulation pump and the compressor to be activated or deactivated, and an operation frequency of the first circulating pump and an operation frequency of the compressor.

18. The energy storage system according to claim 15, wherein the cooling system is further configured to cool the electric energy conversion unit, wherein the cooling system further comprises a second heater, a second circulation pump, and a second electromagnetic three-way valve, wherein a third exchange port of the air-water exchanger is connected to a first end of the second electromagnetic three-way valve and a first end of a cooling element of the electric energy conversion unit;

a fourth exchange port of the air-water exchanger is connected to a second end of the second electromagnetic three-way valve; and a third end of the second electromagnetic three-way valve is connected to a second end of the cooling element of the electric energy conversion unit via the second circulation pump and the second heater.

* * * * *